(12) United States Patent
Katulka

(10) Patent No.: US 8,025,019 B1
(45) Date of Patent: Sep. 27, 2011

(54) BUOYANT BUMPER APPARATUS FOR ABSORBING WATER VESSEL IMPACT AGAINST PILINGS

(76) Inventor: Michael A. Katulka, Davie, FL (US)

( * ) Notice: Subject to any disclaimer, the term of this patent is extended or adjusted under 35 U.S.C. 154(b) by 36 days.

(21) Appl. No.: 11/711,565

(22) Filed: Feb. 27, 2007

(51) Int. Cl.
B63B 21/00 (2006.01)

(52) U.S. Cl. ........................................................ 114/220

(58) Field of Classification Search .................. 114/219, 114/220, 230.27; 405/212–215
See application file for complete search history.

(56) References Cited

U.S. PATENT DOCUMENTS

| | | | | |
|---|---|---|---|---|
| 2,844,943 A | * | 7/1958 | Kennedy | 405/213 |
| 4,804,296 A | * | 2/1989 | Smath | 405/212 |
| 5,603,280 A | * | 2/1997 | Shackelford, Jr. | 114/230.27 |

* cited by examiner

Primary Examiner — Edwin Swinehart
(74) Attorney, Agent, or Firm — Frank L. Kubler

(57) ABSTRACT

A bumper apparatus includes a roller rack and rack fasteners for mounting the roller rack vertically along a dock structure; a bumper assembly having a buoyant structure having sufficient buoyancy to cause the bumper assembly to rise and fall with the water surface and thus with the tide and with any adjacent water vessel; and a rack engaging structure slidably interconnecting the roller rack and the bumper assembly so that the bumper assembly is slidable vertically relative to the roller rack. The roller rack preferably includes a spaced apart upright pair of opposing first and second mounting rails; and a longitudinal series of substantially horizontal cylindrical rollers mounted on individual roller axles extending between and connected to the first and second mounting rails so that the rollers protrude forwardly from the mounting rails.

9 Claims, 3 Drawing Sheets

BUOYANT BUMPER APPARATUS FOR ABSORBING WATER VESSEL IMPACT AGAINST PILINGS

BACKGROUND OF THE INVENTION

1. Field of the Invention

The present invention relates generally to the field of boat and dock equipment. More specifically the present invention relates to a buoyant bumper apparatus for mounting to a piling such as along a dock, the apparatus having a bumper assembly which buoyantly rises and falls with the tide and thus with any adjacent water vessel such as a boat so that the bumper is always positioned between the piling and the contacting portion of the vessel. The bumper apparatus includes a roller rack for mounting vertically along a piling with rack fasteners, and a shock absorbing bumper assembly having a float at its lower end and slidably engaging the roller rack with a rack engaging structure.

The roller rack preferably includes a spaced apart upright pair of opposing first and second mounting rails and a longitudinal series of horizontal cylindrical rollers mounted on individual roller axles extending between and connected to the first and second mounting rails so that the rollers protrude forwardly from the rails. The first and second mounting rails preferably are opposing first and second channel side walls of a rack channel member which are interconnected by a channel back wall, the channel side walls having laterally extending first and second rail flanges extending outwardly respectively from the first and second channel side walls. The rail flanges are part of the rack engaging structure.

The bumper assembly preferably includes a vertically elongate bumper block of rubber or equivalent impact absorbing material preferably containing air bubbles and having first and second block guides on opposing longitudinal sides of the bumper block for slidably engaging the first and second rail flanges. Each block guide preferably has an L-shaped cross-section with a guide side panel abutting and fastened to a corresponding longitudinal side of the bumper block and extends beyond the bumper block toward the roller rack, and has a guide flange angling inwardly from the guide side panel toward the opposing guide flange and spaced from the bumper block. The first and second guide flanges are fitted behind corresponding first and second rail flanges so that the guide flanges hold the bumper block against the rollers while permitting the bumper block to slide vertically along the roller rack. A float of buoyant material or of hollow construction is secured to the bumper block lower end and has sufficient buoyancy to cause the bumper assembly to rise and fall with the tidal height of the water around the piling.

2. Description of the Prior Art

There have long been fixed resilient bumpers on pilings along docks to absorb the impact of boats bumping the docks as a result of wave action or maneuvering into and out of docking position. A problem with these prior bumpers has been that, as the tide rises or falls, the part of the boat striking the piling may be elevated or lowered out of alignment with the bumper so that the boat strikes the piling directly and is damaged.

It is thus an object of the present invention to provide a buoyant bumper apparatus having a bumper assembly which rises and falls with the tides and thus with a moored water vessel, to be continuously positioned between a contacting portion of the vessel and a piling or other dock structure to absorb vessel impacts.

It is another object of the present invention to provide such an apparatus which has a resilient impact absorbing bumper block which can be removed and replaced when needed without removal of the entire apparatus.

It is still another object of the present invention to provide such an apparatus which is easy to install and which fits a variety of piling sizes and which can be secured to a variety of other dock structures as well.

It is finally an object of the present invention to provide such an apparatus which is sturdy, reliable and economical to manufacture.

SUMMARY OF THE INVENTION

The present invention accomplishes the above-stated objectives, as well as others, as may be determined by a fair reading and interpretation of the entire specification.

A bumper apparatus is provided, including a roller rack and rack fasteners for mounting the roller rack vertically along a dock structure; a bumper assembly having a buoyant structure with sufficient buoyancy to cause the bumper assembly to rise and fall in water with the tide and thus with any adjacent water vessel; and a rack engaging structure slidably interconnecting the roller rack and the bumper assembly so that the bumper assembly is slidable vertically relative to the roller rack.

The buoyant structure preferably includes a float connected to the lower end of the bumper assembly. The roller rack preferably includes a spaced apart upright pair of opposing first and second mounting rails; and a longitudinal series of substantially horizontal cylindrical rollers mounted on individual roller axles extending between and connected to the first and second mounting rails so that the rollers protrude forwardly from the mounting rails. The first and second mounting rails preferably are opposing first and second channel side walls of a rack channel member which are interconnected by a channel back wall, the channel side walls having first and second rail flanges extending laterally outward respectively from the first and second channel side walls, and wherein the rail flanges are part of the rack engaging structure. The bumper assembly preferably includes a bumper block of impact absorbing material having first and second block guides on opposing upright sides of the bumper block slidably engaging the first and second rail flanges.

Each block guide preferably has a substantially L-shaped cross-section with a guide side panel abutting and fastened to a corresponding upright side of the bumper block and extends beyond the bumper block toward the roller rack, and has a guide flange angling inwardly from the guide side panel toward the opposing guide flange and spaced from the bumper block, and where the first and second guide flanges are fitted behind corresponding first and second rail flanges and the guide flanges thereby hold the bumper block substantially against the rollers while permitting the bumper block to slide vertically along the roller rack. The bumper block preferably is vertically elongate. The float preferably is formed of one of: buoyant material and a hollow member and has sufficient buoyancy to cause the bumper assembly to rise and fall with the tidal height of the water around the piling.

The first and second channel side walls preferably include spaced apart registering pairs of upper and lower strap slots adjacent to the channel back wall through which rack fasteners in the form of fastening straps pass and wrap around a dock structure and are secured to the dock structure with strap securing structures. The apparatus preferably additionally includes an upper bolt tab having a bolt tab port extending upwardly from the channel back wall and a lower bolt tab having a bolt tab port extending downwardly from the channel back wall, so that a rack fastener in the form of a bolt can pass through each of the two bolt tab ports and through a registering diametric bore in a dock structure to be secured in the dock structure.

The apparatus preferably additionally includes a slide stop structure including a removable stop bolt inserted into a threaded port protruding laterally outward from one of the first and second channel side walls; and a rearwardly protruding stop tab on the corresponding the first or second guide flange which abuts the stop bolt when the bumper assembly is elevated to a pre-established height relative to the roller rack.

A bumper apparatus is further provided, including a stationary guide structure and fasteners for mounting the stationary guide structure vertically along a dock structure; a bumper assembly having buoyant structure with sufficient buoyancy to cause the bumper assembly to rise and fall in water with the tide and thus with any adjacent water vessel; and an engaging structure slidably interconnecting the stationary guide structure and the bumper assembly so that the bumper assembly is slidable vertically relative to the stationary guide structure.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
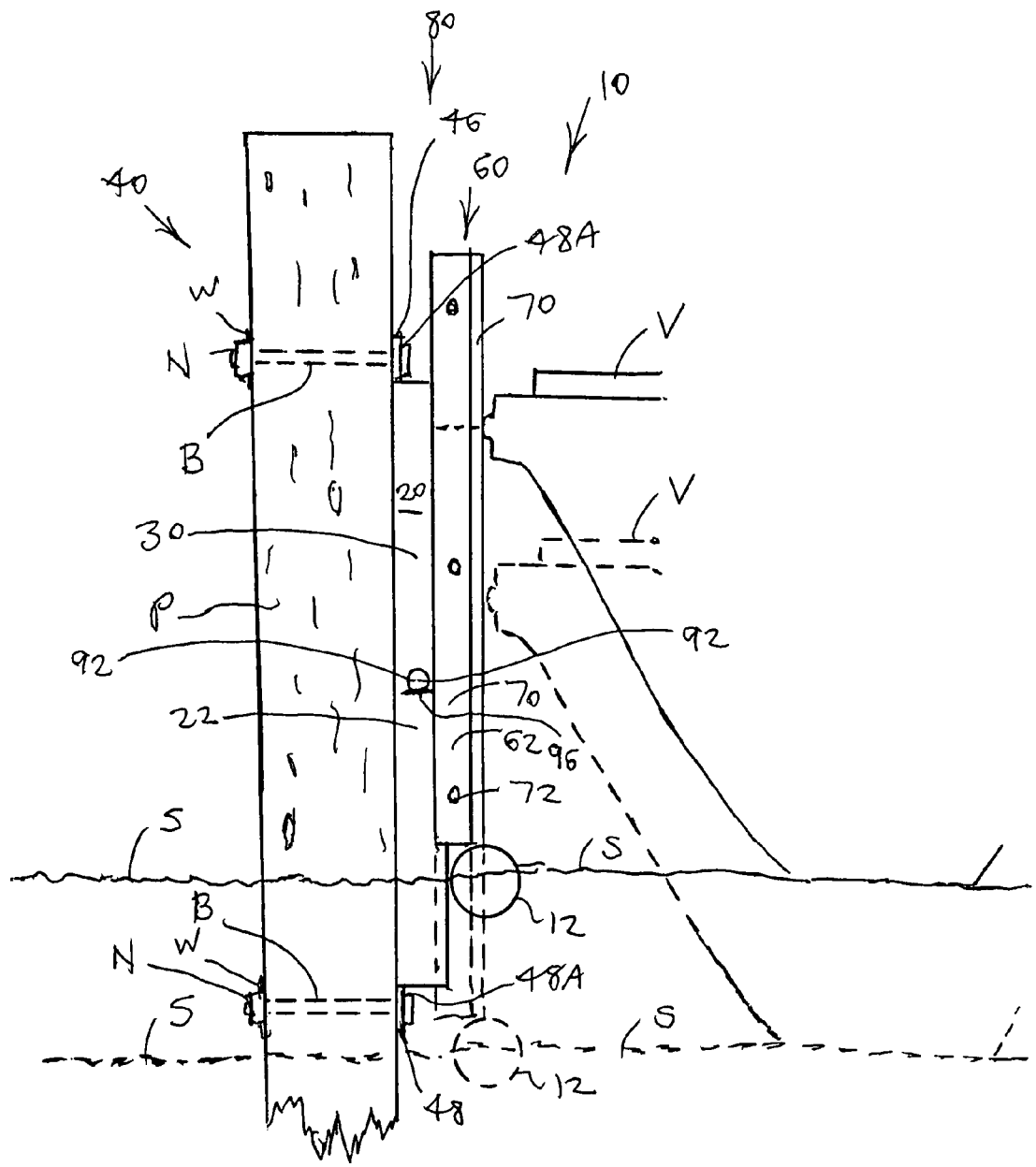
FIG. 1 is a side view of a piling to which the preferred embodiment of the present buoyant bumper apparatus is mounted and a partial view of a boat bumping against the bumper block, showing in broken lines the water surface and boat at lower tide and the corresponding position of the bumper block.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 2:
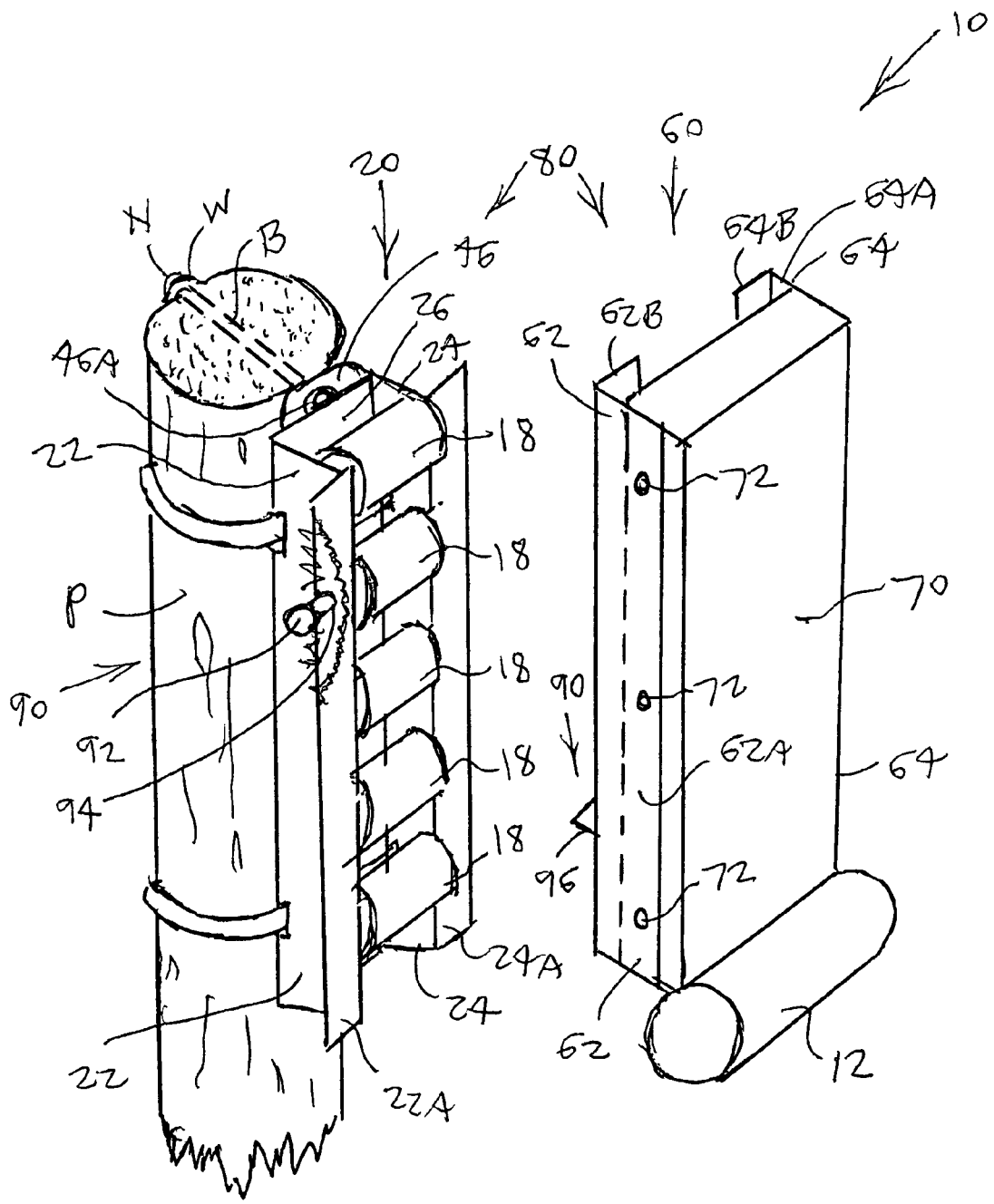
FIG. 2 is a perspective view of the apparatus of FIG. 1 with the bumper assembly separated to reveal the structure of the roller rack.
Figure 3:
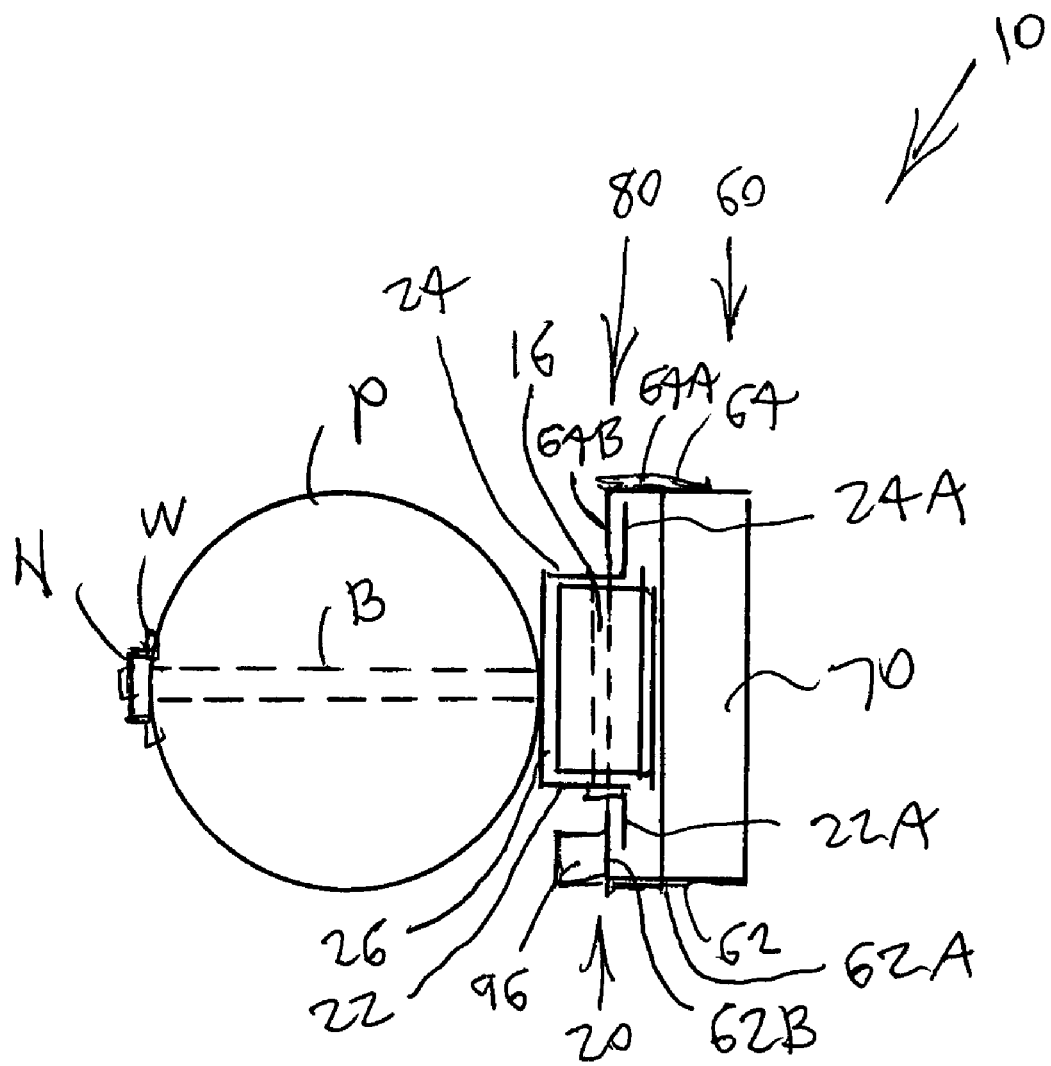
FIG. 3 is a top view of the piling and the mounted apparatus of FIG. 1.

Referring to FIGS. 1-3, a buoyant bumper apparatus 10 is disclosed for mounting to a dock structure such as a piling P apparatus 10 having a bumper assembly 60 which buoyantly rises and falls with the tide and thus with any adjacent moored water vessel V such as a boat so that the bumper assembly 40 is always positioned between the piling P and the contacting portion of the vessel V. The bumper apparatus 10 includes stationary guide structure in the form of a roller rack 20 for mounting vertically along a piling P with rack fasteners 40, and bumper assembly 60 having a float 12 at its lower end and slidably engaging the roller rack 20 through a rack engaging structure 80.

The roller rack 20 preferably includes a spaced apart upright pair of opposing first and second mounting rails 22 and 24 and a longitudinal series of horizontal cylindrical rollers 18 mounted on individual roller axles 16 extending between and connected to the first and second mounting rails 22 and 24 so that the rollers 18 protrude forwardly from rails 22 and 24. The first and second mounting rails 22 and 24 preferably are opposing first and second channel side walls 22 and 24 of a rack channel member 30 which are interconnected by a channel back wall 26, the channel side walls 22 and 24 having laterally extending first and second rail flanges 22A and 24A respectively connected to and integral with the first and second channel side walls 22 and 24. The rail flanges 22A and 24A are part of the rack engaging structure 80.

The bumper assembly 60 preferably includes a vertically elongate bumper block 70 of rubber or equivalent impact absorbing material preferably containing air bubbles and having first and second block guides 62 and 64 on opposing longitudinal sides of the bumper block 70 for slidably engaging the first and second rail flanges 22A and 24A. Each block guide 62 and 64 preferably has an L-shaped cross-section with a guide side panel 62A and 64A respectively abutting and fastened to a corresponding longitudinal side of the bumper block 70 with a guide fastener 72 and extends beyond the bumper block 70 toward the roller rack 20, and has a guide flange 62B and 64B, respectively, angling inwardly from the corresponding guide side panel 62A or 64A toward the opposing guide flange 62B or 64B and spaced rearwardly from the bumper block 70. The first and second guide flanges 62B and 64B are fitted behind corresponding first and second rail flanges 22A and 24A so that the guide flanges 62B and 64B hold the bumper block 70 substantially against the rollers 18 while permitting the bumper block 70 to slide and roll vertically along the roller rack 20. The float 12 is either formed of buoyant material or is of hollow construction and is secured to the bumper block 70 lower end. Float 12 has sufficient buoyancy to cause the bumper assembly 60 to rise and fall with the tidal height of the water surface S around piling P.

The first and second channel side walls 22 and 24 preferably include spaced apart registering pairs of upper and lower strap slots 42 and 44 adjacent to the channel back wall 26 through which rack fasteners 40 in the form of fastening straps S pass and wrap around a piling P or other dock structure and are secured such as with buckles (not shown). Alternatively or additionally, an upper bolt tab 46 having a bolt tab port 46A extends upwardly from the channel back wall 26 and a lower bolt tab 48 having a bolt tab port 48A extends downwardly from the channel back wall 26, so that a rack fastener 40 in the form of a bolt B can pass through each of the two bolt tab ports 46A and 48A and through a registering diametric bore in a piling P to be secured in the piling P with nuts N and lock washers W.

A slide stop structure 90 preferably is provided which prevents the bumper assembly 60 from rising relative to the roller rack 20 beyond a certain point. The stop structure 90 preferably is releasable so that the bumper assembly 60 can be slid up and lifted off the roller rack 20 for maintenance or periodic replacement. The slide stop structure 90 preferably includes a removable stop bolt 92 inserted into a threaded port 94 in and protruding laterally outward from one of the first and second channel side walls 22 and 24, and a rearwardly protruding stop tab 96 on the corresponding first or second guide flange 62B or 64B which abuts the stop bolt 92 when the bumper assembly 60 is elevated to a pre-established height relative to the roller rack 20. Removal of the bumper assembly 60 to replace a weathered bumper block 70 with a new one is accomplished by unscrewing the removable stop bolt 92 from the channel side wall 22 or 24 and then lifting the bumper assembly 60 above and out of engagement with the roller rack 20.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A bumper apparatus, comprising:
    a roller rack and rack fasteners for mounting said roller rack vertically along a dock structure;
    a bumper assembly having buoyant means with sufficient buoyancy to cause said bumper assembly to rise and fall in water with the tide and thus with any adjacent water vessel;
    and rack engaging means slidably interconnecting said roller rack and said bumper assembly such that said bumper assembly is slidable vertically relative to said roller rack;
    wherein said roller rack comprises a spaced apart upright pair of opposing first and second mounting rails, and a longitudinal series of substantially horizontal cylindrical rollers mounted on individual roller axles extending between and connected to said first and second mounting rails such that said rollers protrude forwardly from said mounting rails.

2. The apparatus of claim 1, wherein said first and second mounting rails are opposing first and second channel side walls of a rack channel member which are interconnected by a channel back wall, said channel side walls having first and second rail flanges extending laterally outward respectively from said first and second channel side walls, and wherein said rail flanges are part of said rack engaging structure.

3. The apparatus of claim 2, wherein said bumper assembly comprises a bumper block of impact absorbing material having first and second block guides on opposing upright sides of said bumper block slidably engaging said first and second rail flanges.

4. The apparatus of claim 3, wherein each said block guide has a substantially L-shaped cross-section with a guide side panel abutting and fastened to a corresponding upright side of said bumper block and extends beyond said bumper block toward said roller rack, and has a guide flange angling inwardly from said guide side panel toward the opposing said guide flange and spaced from said bumper block, and wherein said first and second guide flanges are fitted behind corresponding said first and second rail flanges and said guide flanges thereby hold said bumper block substantially against said rollers while permitting said bumper block to slide vertically along said roller rack.

5. The apparatus of claim 3, wherein said bumper block is vertically elongate.

6. The apparatus of claim 1, wherein said buoyant means comprises a float connected to the lower end of said bumper assembly wherein said float is formed of one of: buoyant material and a hollow member and has sufficient buoyancy to cause said bumper assembly to rise and fall with the tidal height of the water around the piling.

7. The apparatus of claim 2, wherein said first and second channel side walls comprise spaced apart registering pairs of upper and lower strap slots adjacent to said channel back wall through which rack fasteners in the form of fastening straps pass and wrap around a dock structure and are secured to the dock structure with strap securing means.

8. The apparatus of claim 2, additionally comprising an upper bolt tab having a bolt tab port extending upwardly from said channel back wall and a lower bolt tab having a bolt tab port extending downwardly from said channel back wall, such that a rack fastener in the form of a bolt can pass through each of said two bolt tab ports and through a registering diametric bore in a dock structure to be secured in the dock structure.

9. The apparatus of claim 4, additionally comprising a slide stop structure comprising:
    a removable stop bolt inserted into a threaded port protruding laterally outward from one of said first and second channel side walls;
    and a rearwardly protruding stop tab on the corresponding said first or second guide flange which abuts said stop bolt when said bumper assembly is elevated to a pre-established height relative to said roller rack.

* * * * *